United States Patent
Zhang et al.

(10) Patent No.: US 12,052,776 B2
(45) Date of Patent: Jul. 30, 2024

(54) METHODS AND APPARATUSES FOR DATA COMMUNICATION BETWEEN TERMINAL DEVICE AND APPLICATION SERVER

(71) Applicant: Telefonaktiebolaget LM Ericsson (publ), Stockholm (SE)

(72) Inventors: Yun Zhang, Beijing (CN); Jingrui Tao, Guangdong Guangzhou (CN); Fengpei Zhang, Guangdong Guangzhou (CN)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 407 days.

(21) Appl. No.: 17/419,882

(22) PCT Filed: Jan. 20, 2020

(86) PCT No.: PCT/CN2020/073263
§ 371 (c)(1),
(2) Date: Jun. 30, 2021

(87) PCT Pub. No.: WO2020/151668
PCT Pub. Date: Jul. 30, 2020

(65) Prior Publication Data
US 2022/0117014 A1    Apr. 14, 2022

(30) Foreign Application Priority Data
Jan. 25, 2019 (WO) ................ PCT/CN2019/073221

(51) Int. Cl.
*H04W 76/11* (2018.01)
*H04L 41/0806* (2022.01)
(52) U.S. Cl.
CPC ......... *H04W 76/11* (2018.02); *H04L 41/0806* (2013.01)

(58) Field of Classification Search
CPC ...... H04W 76/11; H04W 4/70; H04L 41/0806
(Continued)

(56) References Cited

U.S. PATENT DOCUMENTS 11,589,208 B2 *  2/2023  Kim ................. H04W 28/0205
2017/0317894 A1  11/2017  Dao et al.
(Continued)

FOREIGN PATENT DOCUMENTS

CN   107438290 A   12/2017
CN   108123783 A    6/2018
(Continued)

OTHER PUBLICATIONS

"3GPP TS 23.401 V15.4.0", 3rd Generation Partnership Project; Technical Specification Group Services and System Aspects; General Packet Radio Service (GPRS) enhancements for Evolved Universal Terrestrial Radio Access Network (E-UTRAN) (Release 15), Jun. 2018, pp. 1-410.
(Continued)

*Primary Examiner* — Rownak Islam
(74) *Attorney, Agent, or Firm* — Weisberg I.P. Law, P.A.

(57) ABSTRACT

Methods and apparatuses are disclosed for data communication between terminal device and application server. According to an embodiment, a network exposure node receives, from a first application server in operator trust domain, configuration information that can be used for data delivery for a terminal device. The network exposure node receives data from one of the terminal device and the first application server and forwards the data to the other of the terminal device and the first application server based on the configuration information.

20 Claims, 10 Drawing Sheets

(58) Field of Classification Search
USPC .......................................................... 370/328
See application file for complete search history.

(56) References Cited

U.S. PATENT DOCUMENTS

| | | | |
|---|---|---|---|
| 2018/0317121 A1* | 11/2018 | Liao | H04W 28/0289 |
| 2019/0090123 A1* | 3/2019 | Abraham | H04L 67/14 |
| 2020/0177678 A1* | 6/2020 | Livanos | H04L 41/0895 |

FOREIGN PATENT DOCUMENTS

| | | | |
|---|---|---|---|
| CN | 108476394 A | 8/2018 | |
| EP | 2953400 A1 | 12/2015 | |
| WO | WO-2015144196 A1 * | 10/2015 | H04L 63/04 |
| WO | WO-2017113287 A1 * | 7/2017 | |
| WO | 2018067956 A1 | 4/2018 | |
| WO | 2018166595 A1 | 9/2018 | |
| WO | 2018206101 A1 | 11/2018 | |

OTHER PUBLICATIONS

"3GPP TS 29.122 V15.0.0", 3rd Generation Partnership Project; Technical Specification Group Core Network and Terminals; T8 reference point for Northbound APIs; (Release 15), Jun. 2018, pp. 1-255.

"Environmental Monitoring A Guide to Ensuring a Successful Mobile IoT Deployment", GSMA, www.gsma.com/smartcities, Feb. 2018, pp. 1-16.

"3GPP TS 23.682 V15.5.0", 3rd Generation Partnership Project; Technical Specification Group Services and System Aspects; Architecture enhancements to facilitate communications with packet data networks and applications (Release 15), Jun. 2018, pp. 1-125.

EPO Communication with Supplementary European Search Report dated Jul. 21, 2022 for Patent Application No. 20745503.1, consisting of 8-pages.

* cited by examiner

METHODS AND APPARATUSES FOR DATA COMMUNICATION BETWEEN TERMINAL DEVICE AND APPLICATION SERVER

TECHNICAL FIELD

Embodiments of the disclosure generally relate to communication, and, more particularly, to methods and apparatuses for data communication between terminal device and application server.

BACKGROUND

This section introduces aspects that may facilitate better understanding of the present disclosure. Accordingly, the statements of this section are to be read in this light and are not to be understood as admissions about what is in the prior art or what is not in the prior art.

Service capability exposure function (SCEF) or equivalent functional entity in the 5th generation (5G) core called as network exposure function (NEF) is the key entity within the 3rd generation partnership project (3GPP) architecture for service capability exposure that provides a means to securely expose the services and capabilities provided by 3GPP network interfaces through application programming interfaces (APIs) to application servers. SCEF or NEF provides small data delivery or network Internet of things (IoT) message function (especially non-Internet protocol (non-IP) data delivery) from user equipment (UE) to application server (AS).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for data communication between terminal device and application server.

According to a first aspect of the disclosure, there is provided a method implemented at a network exposure node. The method may comprise receiving, from a first application server in operator trust domain, configuration information that can be used for data delivery for a terminal device. The method may further comprise receiving data from one of the terminal device and the first application server. The method may further comprise forwarding the data to the other of the terminal device and the first application server based on the configuration information.

In an embodiment of the disclosure, the first application server may be deployed in operator mobile edge.

In an embodiment of the disclosure, the configuration information may comprise identity (ID) information of the terminal device, network address information of the first application server and an access point name (APN). The data may be received from the terminal device and forwarded to the first application server based on the network address information of the first application server corresponding to the ID information of the terminal device and the APN.

In an embodiment of the disclosure, the configuration information may comprise ID information of the terminal device, ID information of the first application server and an APN. The method may further comprise obtaining, from a packet gateway node, the ID information and corresponding current network address information of the first application server. The data may be received from the terminal device and forwarded to the first application server based on the current address information of the first application server corresponding to the ID information of the terminal device and the APN.

In an embodiment of the disclosure, the configuration information may comprise network address or ID information of at least one additional destination to which data is to be delivered from the terminal device. The method may further comprise forwarding the data received from the terminal device to the at least one additional destination based on the configuration information.

In an embodiment of the disclosure, one of the at least one additional destination may be a second application server in Internet domain.

In an embodiment of the disclosure, the data may be received from the terminal device in a form of Internet protocol (IP) data or non-IP data. The IP data may be forwarded through a same interface as that used for the non-IP data.

In an embodiment of the disclosure, the data may be received from the first application server in a form of non-IP data or IP data. The IP data may be received from the first application server through a same interface as that used for the non-IP data.

In an embodiment of the disclosure, the configuration information may comprise ID information of the terminal device, network address or ID information of the first application server and an APN. The data may be received from the first application server in a form of IP data. The method may further comprise obtaining, from a packet gateway node, the ID information and corresponding current network address information of the terminal device. The IP data may be forwarded to the terminal device based on the current network address information of the terminal device corresponding to the ID information of the terminal device.

In an embodiment of the disclosure, the network exposure node may be an SCEF or NEF and the same interface may be T8 non-IP data delivery (NIDD) interface.

In an embodiment of the disclosure, the ID information may be an external ID or a mobile subscriber international integrated service digital network (ISDN) number (MSISDN) and the network address information may be a uniform resource identifier (URI).

According to a second aspect of the disclosure, there is provided a method implemented at an application server in operator trust domain. The method may comprise sending, to a network exposure node, configuration information that can be used for data delivery for a terminal device. The method may further comprise receiving data from the terminal device via the network exposure node or sending data to the terminal device via the network exposure node.

In an embodiment of the disclosure, the application server may be deployed in operator mobile edge.

In an embodiment of the disclosure, the configuration information may comprise network address or ID information of the application server and at least one additional destination to which data is to be delivered from the terminal device via the network exposure node.

In an embodiment of the disclosure, the data may be received via the network exposure node in a form of IP data or non-IP data. The IP data is received through a same interface of the network exposure node as that used for the non-IP data.

In an embodiment of the disclosure, the data may be sent via the network exposure node in a form of IP data or non-IP data. The IP data may be sent through a same interface of the network exposure node as that used for the non-IP data.

In an embodiment of the disclosure, the network exposure node may be an SCEF or NEF and the same interface is T8 NIDD interface.

According to a third aspect of the disclosure, there is provided a network exposure node. The network exposure node may comprise at least one processor and at least one memory. The at least one memory may contain instructions executable by the at least one processor, whereby the network exposure node may be operative to receive, from a first application server in operator trust domain, configuration information that can be used for data delivery for a terminal device. The network exposure node may be further operative to receive data from one of the terminal device and the first application server. The network exposure node may be further operative to forward the data to the other of the terminal device and the first application server based on the configuration information.

In an embodiment of the disclosure, the network exposure node may be operative to perform the method according to the above first aspect.

According to a fourth aspect of the disclosure, there is provided an application server in operator trust domain. The application server may comprise at least one processor and at least one memory. The at least one memory may contain instructions executable by the at least one processor, whereby the application server may be operative to send, to a network exposure node, configuration information that can be used for data delivery for a terminal device. The application server may be further operative to receive data from the terminal device via the network exposure node or send data to the terminal device via the network exposure node.

In an embodiment of the disclosure, the application server may be operative to perform the method according to the above second aspect.

According to a fifth aspect of the disclosure, there is provided a computer program product. The computer program product may comprise instructions which when executed by at least one processor, cause the at least one processor to perform the method according to the above first or second aspect.

According to a sixth aspect of the disclosure, there is provided a computer readable storage medium. The computer readable storage medium may comprise instructions which when executed by at least one processor, cause the at least one processor to perform the method according to the above first or second aspect.

According to a seventh aspect of the disclosure, there is provided a network exposure node. The network exposure node may comprise a first reception module for receiving, from a first application server in operator trust domain, configuration information that can be used for data delivery for a terminal device. The network exposure node may further comprise a second reception module for receiving data from one of the terminal device and the first application server. The network exposure node may further comprise a forwarding module for forwarding the data to the other of the terminal device and the first application server based on the configuration information.

According to an eighth aspect of the disclosure, there is provided an application server in operator trust domain. The application server may comprise a sending module for sending, to a network exposure node, configuration information that can be used for data delivery for a terminal device. The application server may further comprise a transceiving module for receiving data from the terminal device via the network exposure node or sending data to the terminal device via the network exposure node.

According to some embodiment(s) of the disclosure, the data communication between a terminal device and an application server in operator trust domain can be facilitated.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

Figure 1:
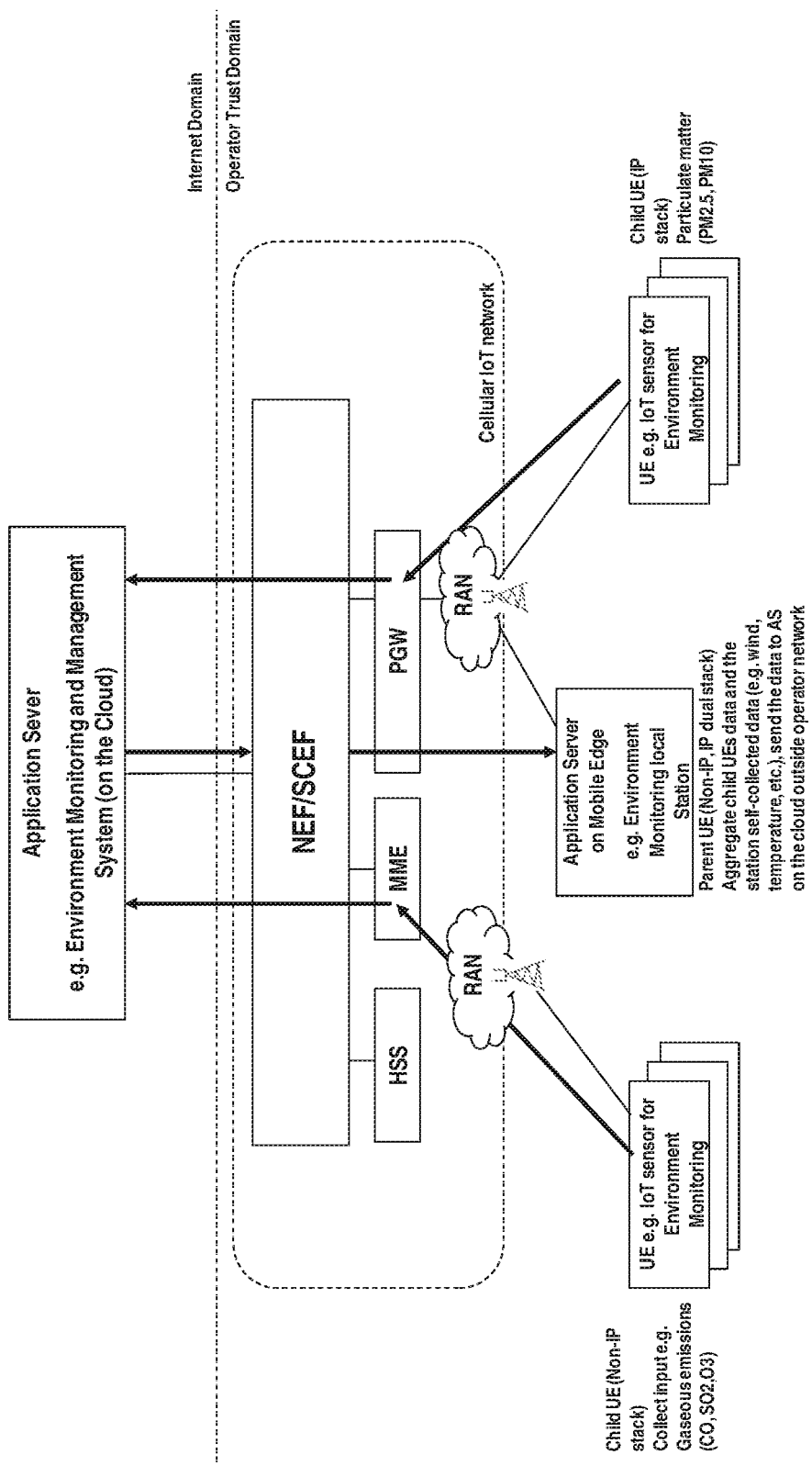
FIG. 1 is a diagram showing an existing communication system for environment monitoring.

For the purpose of explanation, details are set forth in the following description in order to provide a thorough understanding of the embodiments disclosed. It is apparent, however, to those skilled in the art that the embodiments may be implemented without these specific details or with an equivalent arrangement.

There may be use cases that data communication from UE to application server (AS) on mobile edge communication and then to AS on the cloud is required. One example for such use cases may be environmental monitoring and management. It is becoming more important, as managing the environment and understanding its impacts drives increasing amounts of regulation and activities to reduce pollution. Internet of things (IoT) sensors are able to give accurate real-time data on the environment around us to help us understand how we affect the environment and take actions to improve quality of life in cities.

Environmental sensors have been reduced in size and cost. They are now readily available and can be installed at many points across a city. Mobile technology has also advanced to provide a robust connectivity solution, cellular IoT (CIoT), that enables these sensors to be deployed efficiently and effectively by city authorities and other bodies.

Cities can measure many parameters as part of an environmental monitoring deployment that utilizes connected IoT sensors, including air and water quality, weather, noise, smoke and other attributes that may affect quality of life in a city including those related to disaster management, such as the earthquake and flood sensors.

In order to control these emissions, the city first needs to know both where the pollution hotspots are and how the pollution is generated. With this information, cities can plan for cleaner air by incentivizing the drivers of polluting vehicles to stay away or changing road layouts to direct traffic away from sensitive area. More information related to environmental monitoring use case and solution may refer to global system for mobile communications (GSM) association (GSMA) "Environmental Monitoring: A Guide to Ensuring a Successful Mobile IoT Deployment".

The following table shows an example CIoT SCEF or NEF technology as the mobile data delivery for network IoT message function in environment monitoring business scenario to bridge among UEs, application sever on mobile edge and application server on the cloud.

communication system comprises an operator trust domain and an Internet domain. In the operator trust domain, there are UEs (e.g. IoT sensors) supporting non-IP data delivery (NIDD), UEs (e.g. IoT sensors) supporting IP data delivery (IPDD), an application server on mobile edge (e.g. an environment monitoring local station), radio access networks (RANs), a home subscriber server (HSS), a mobility management entity (MME), a packet data network (PDN) gateway (PGW), and a network exposure function (NEF)/service capability exposure function (SCEF). The term "on mobile edge" may refer to "at the edge of a cellular network". In the Internet domain, there is an application server such as an environment monitoring and management system on the cloud.

Small data communication includes infrequent and frequent small data transmission aiming to support efficient small data transmissions for CIoT, e.g. tracking devices for both mobile originated (MO) and mobile terminated (MT) use cases. It is expected that the number of such devices can increase exponentially, but the data size per device will remain small. For the small data communication, there is no UE to UE communication defined in 3GPP technical specification (TS) 23.682. UE will always communicate with the application server first (especially the application server on the cloud) via the internet connection outside the operator

| Node name | Function in Environment Monitoring | Main Functions description |
|---|---|---|
| UE (Non-IP or IP of Child UE) | Cellular IoT sensor for Environment Monitoring | Collect input e.g. Gaseous emissions (CO, $SO_2$, $O_3$), Particulate matter (PM2.5, PM10). Send the sensor data to Environment Monitoring Local or District Station. |
| Application Server on Mobile Edge (Parent UE) | Environment Monitoring Local or District Station | Environmental monitoring local or district stations to collect higher quality environment measure and aggregate the small sensors data from the managed areas to obtain a good picture of a whole area. This is known as data fusion and allows data from many low accuracy devices to be combined to create higher accuracy results, and as the AS Mobile Edge to send the data to AS on the cloud. Compare with the traditional Application Server, AS on Mobile Edge is located in operator trust domain, AS on the Mobile Edge communicates with UE via the mobile network connection. |
| Application Sever on the Cloud | Environment Monitoring and Management System | Aggregate many different data sources are available to the city from a range of sources e.g. the collected data of the environment monitoring from Application Server on Mobile Edge. When these different data sources are integrated, valuable insight can become clear. The data from UE could be combined with weather, traffic and other data to provide an analysis of the environment across a city and how issues may be caused, allowing remedial actions to be taken, for example an early warning system to automatically alert emergency services to dangers as they arise, and set-off pre-planning response plan. AS on the Cloud is located in internet domain that is non operator trust domain, AS on the Cloud communicates with UE via the internet connection. |
| SCEF or NEF | Service Capability Exposure Function or Network Exposure Function | As Network Capability Exposure Function node include Network IoT Message delivery function support to route IoT device data from UE to AS |

FIG. 1 is a diagram showing an existing communication system for environment monitoring use case. As shown, the trust domain before communicating with other UEs. For example, in the existing system shown in FIG. 1, the application server on the cloud is the main routing node for UEs' communications and all UEs communicate with the application server on the cloud. This is not efficient when massive UEs need to communicate with the application server on mobile edge which may be considered as a parent UE. In addition, CIoT UE normally will go for sleep mode and thus need network IoT message function in the operator trust domain.

The present disclosure proposes improved solutions for data communication between terminal device and application server. Hereinafter, the solutions will be described in detail with reference to FIGS. 2-14.

Figure 2:
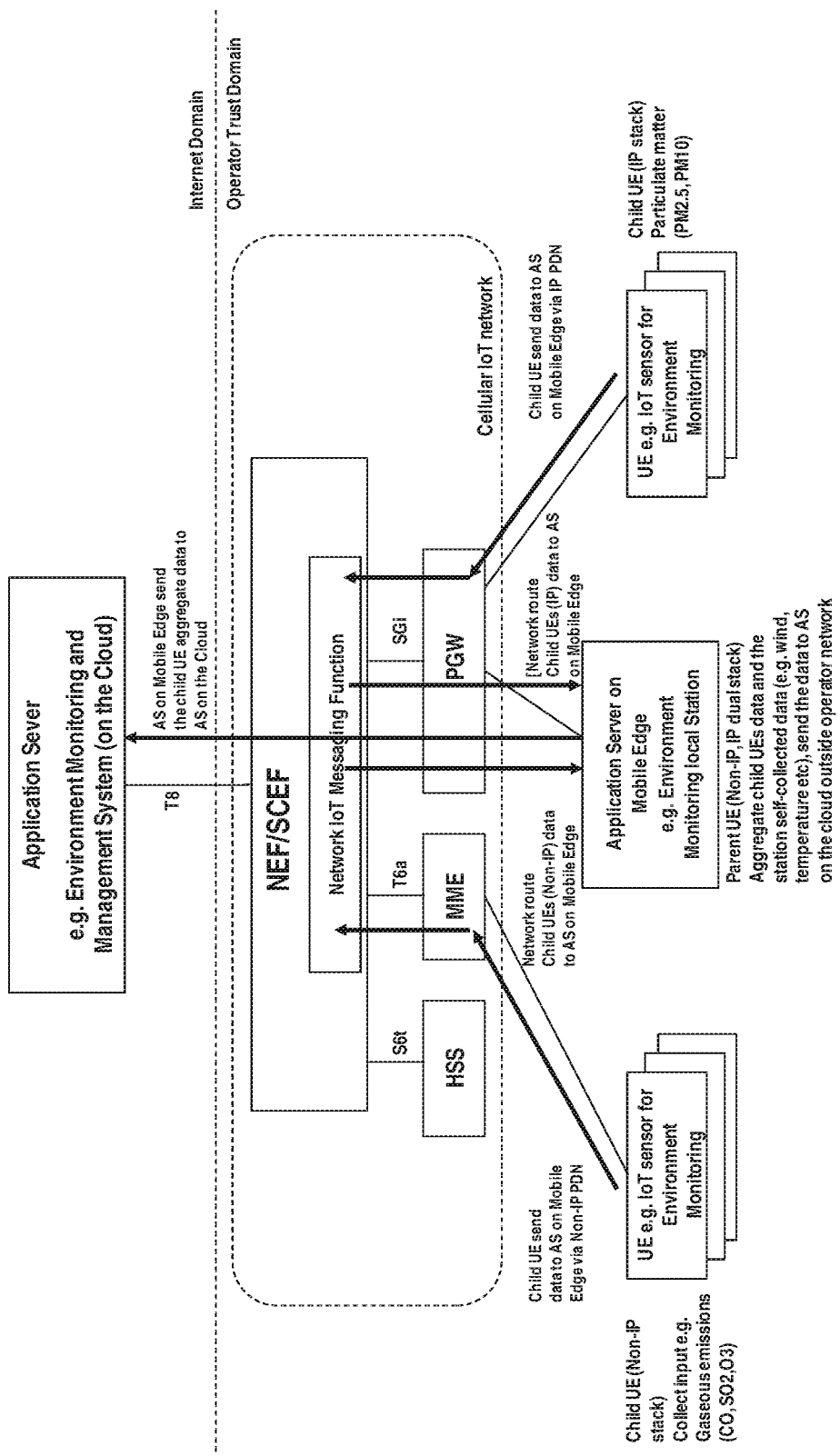
FIG. 2 is a diagram showing an exemplary communication system according to an embodiment of the disclosure.

FIG. 2 is a diagram showing an exemplary communication system according to an embodiment of the disclosure. Compared with the existing system shown in FIG. 1, the SCEF or NEF is used to play as network IoT message function for routing UE to UE communication within the operator trust domain in this embodiment. For example, a child UE can send data to the application server on mobile edge via non-IP PDN. The child UE's non-IP data can be routed to the application server on mobile edge via the NEF/SCEF. Similarly, a child UE can send data to the application server on mobile edge via IP PDN. The child UE's IP data can be routed to the application server on mobile edge via the NEF/SCEF. The application server on mobile edge can send child UEs' aggregate data to the application server on the cloud.

It should be noted that RANs are omitted in FIG. 2 for brevity and the number of each entity shown in FIG. 2 may be more than one. Although environment monitoring use case is shown in FIG. 2, it is merely an exemplary example for illustration purpose. Those skilled in the art will understand that the principle of the present disclosure may also be applicable to any other case in which data communication between a terminal device and an application server in operator trust domain is required. It should also be noted that the HSS, the MME and the PGW are merely exemplary examples of the components in the communication system and may be replaced by components with similar functionalities. For example, in the fifth generation (5G) core network (CN), the HSS may be replaced by a unified data management (UDM), the MME may be replaced by an access and mobility management function (AMF), and the PGW may be replaced by a user plane function (UPF). That is, the principle of the present disclosure may be reused for data delivery in both 5G and 4G networks.

The term UE may also be referred to as, for example, terminal device, access terminal, mobile station, mobile unit, subscriber station, or the like. It may refer to any end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a UE may represent a machine or other device that performs monitoring and/or measurements, and transmits the results of such monitoring and/or measurements to another UE and/or a network equipment. In this case, the UE may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Figure 3:
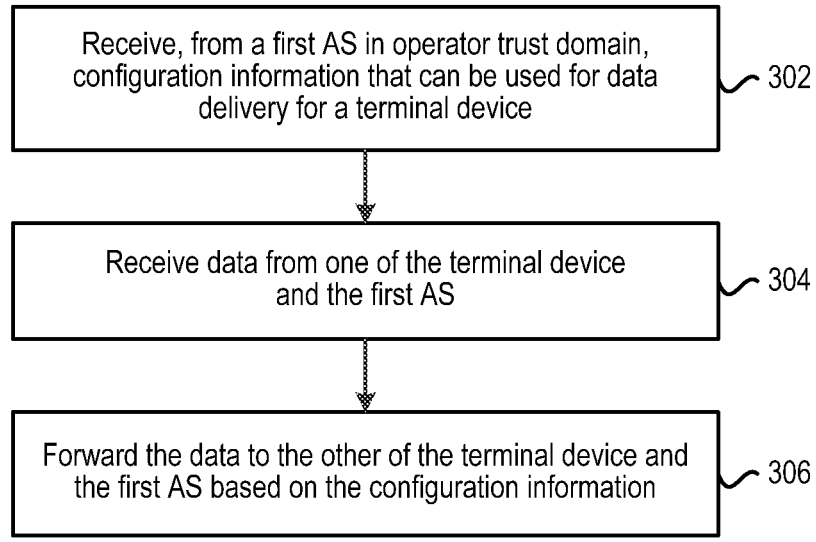
FIG. 3 is a flowchart illustrating a method implemented at a network exposure node according to an embodiment of the disclosure.

FIG. 3 is a flowchart illustrating a method implemented at a network exposure node according to an embodiment of the disclosure. The network exposure node may take the form of an SCEF, an NEF, or any other entity having similar functionality. At block 302, the network exposure node receives, from a first application server in operator trust domain, configuration information that can be used for data delivery for a terminal device. For example, the first application server may be deployed on operator mobile edge. In environment monitoring use case, it may act as an environment monitoring local station. For a terminal device supporting NIDD, the configuration information may be received in an NIDD configuration request message. For a terminal device supporting IPDD, the configuration information may be received in an IPDD configuration request message. In a case that the network exposure node is an SCEF or NEF, NIDD configuration interface (e.g. API) such as that defined in 3GPP TS 29.122 may be reused for IPDD configuration.

Depending on whether the first application server has a static or dynamic IP address and the direction of data delivery between the terminal device and the first application server, there may be three options. In the first option, the first application server has a static IP address and data is delivered from the terminal device to the first application server. In the second option, the first application server has a dynamic IP address and data is delivered from the terminal device to the first application server. In the third option, the first application server has a static or dynamic IP address and data is delivered from the first application server to the terminal device. For example, block 302 may implemented as block 402 in the first option, as block 502 in the second option, and as block 602 in the third option, which will be described later.

At block 304, the network exposure node receives data from one of the terminal device and the first application server. For example, block 304 may implemented as block 404 in the first option, as block 504 in the second option, and as block 604 in the third option, which will be described later. At block 306, the network exposure node forwards the data to the other of the terminal device and the first application server based on the configuration information. For example, block 306 may be implemented as block 406 in the first option, as block 506 in the second option, and as block 606 in the third option, which will be described later. In this way, since the network exposure node instead of the application server on the cloud is used as the routing node, a more easy way can be provided to route the communication between the terminal device and the application server within the operator trust domain.

Figure 4:
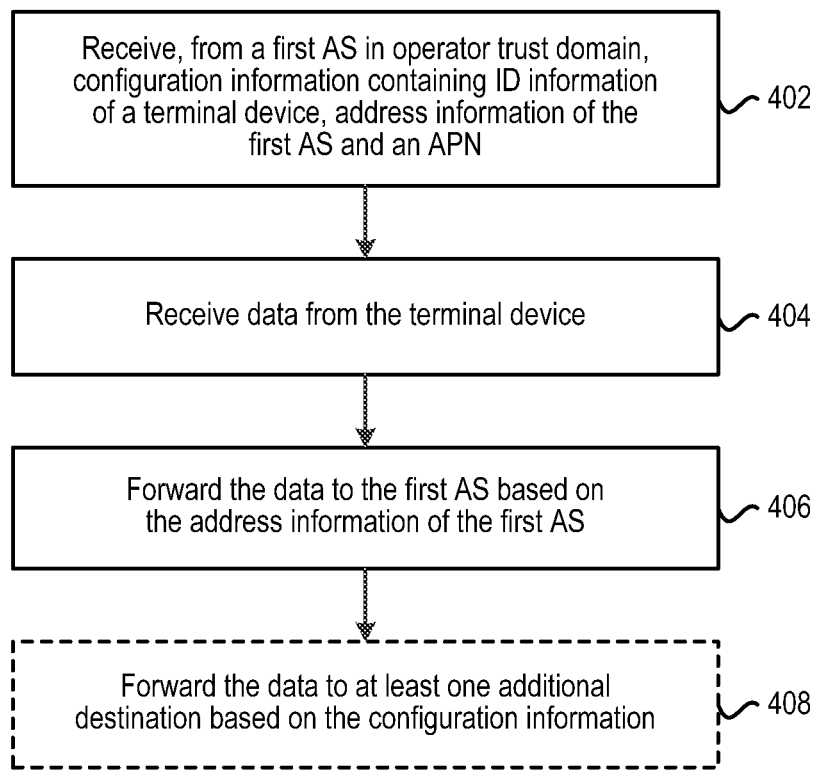
FIG. 4 is a flowchart illustrating a method implemented at a network exposure node according to another embodiment of the disclosure.

FIG. 4 is a flowchart illustrating a method implemented at a network exposure node according to another embodiment of the disclosure. The method corresponds to the first option described above. At block 402, the network exposure node receives, from a first application server in operator trust domain, configuration information that contains identity (ID) information of the terminal device, network address information of the first application server and an APN. Since the first application server has a static IP address in this option, the configuration information contains the network address information of the first application server. For example, this network address information may be a URI of the first application server, which may be translated to a corresponding IP address. The ID information of the terminal device may be an external ID or an MSISDN of the terminal device. The APN refers to an access point name via which the network address information of the first application server is reachable.

At block 404, the network exposure node receives data from the terminal device. For the terminal device supporting NIDD, the data may be received through NIDD procedure such as that defined in 3GPP TS 23.682. For the terminal device supporting IPDD, the data may be received via a packet gateway node such as a PGW. At block 406, the network exposure node forwards the data to the first application server based on the network address information of the first application server corresponding to the ID information of the terminal device and the APN. For example, due to the reception of the data from the terminal device, the ID information of the terminal device and the APN may be known by the network exposure node. Based on this combination of the ID information and the APN, the network address information of the first application server corresponding to this combination may be determined from the configuration information received at block 402. Then, the determined network address information may be used for forwarding the data to the first application server. For the terminal device supporting NIDD, the data may be forwarded through T8 NIDD interface such as that defined in 3GPP TS 29.122. For the terminal device supporting IPDD, the T8 NIDD interface may be reused for forwarding the data.

Optionally, the configuration information received at block 402 may further contain network address information of at least one additional destination to which data is to be delivered from the terminal device. Accordingly, optionally, at block 408, the network exposure node may forward the data to the at least one additional destination based on the configuration information. For example, one of the at least one additional destination may be a second application server in Internet domain.

Figure 5:
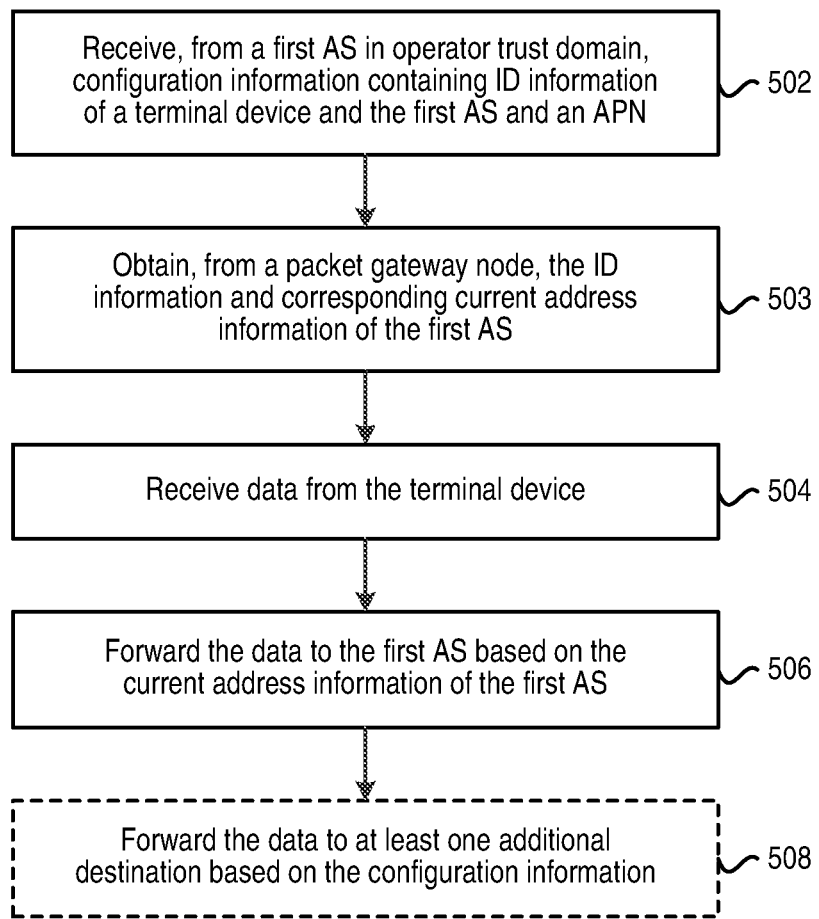
FIG. 5 is a flowchart illustrating a method implemented at a network exposure node according to another embodiment of the disclosure.

FIG. 5 is a flowchart illustrating a method implemented at a network exposure node according to another embodiment of the disclosure. The method corresponds to the second option described above. At block 502, the network exposure node receives, from a first application server in operator trust domain, configuration information that contains ID information of the terminal device, ID information of the first application server and an APN. Since the first application server has a dynamic IP address in this option, the configuration information contains ID information instead of network address information of the first application server. For example, the ID information of the first application server may be an external ID or an MSISDN of the first application server which may also be considered as a parent UE. At block 503, the network exposure node obtains, from a packet gateway node, the ID information and corresponding current network address information of the first application server. The packet gateway node may be a PGW or any other entity having similar functionality. For example, the packet gateway node may send the information actively or the network exposure node may inquire the packet gateway node about the information.

At block 504, the network exposure node receives data from the terminal device. Block 504 may be the same as block 404 and its details are omitted here. At block 506, the network exposure node forwards the data to the first application server based on the current address information of the first application server corresponding to the ID information of the terminal device and the APN. For example, due to the reception of the data from the terminal device, the ID information of the terminal device and the APN may be known by the network exposure node. Based on this combination of the ID information and the APN, the ID information of the first application server corresponding to this combination may be determined from the configuration information received at block 502. Then, the current network address information of the first application server corresponding to its ID information may be determined from the information obtained at block 503. Then, the determined current network address information may be used for forwarding the data to the first application server.

Optionally, the configuration information received at block 502 may further contain ID information of at least one additional destination to which data is to be delivered from the terminal device. Accordingly, at block 508, the network exposure node may forward the data to the at least one additional destination based at least on the configuration information. Specifically, the current network address information of the at least one additional destination may be determined in a way similar to blocks 503 and 506. Then, the data may be forwarded based on the determined current network address information.

Figure 6:
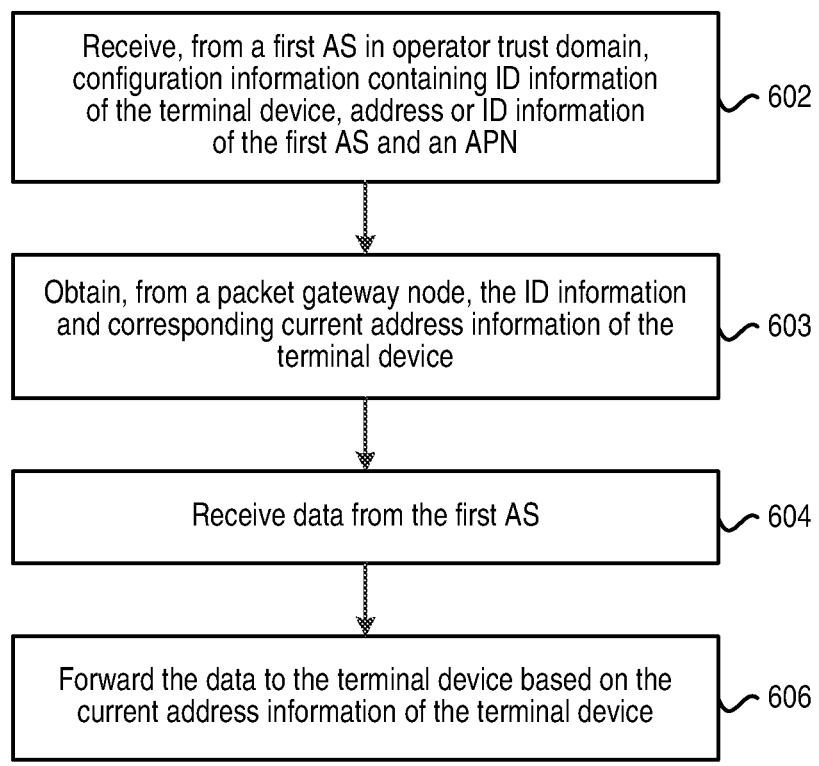
FIG. 6 is a flowchart illustrating a method implemented at a network exposure node according to another embodiment of the disclosure.

FIG. 6 is a flowchart illustrating a method implemented at a network exposure node according to another embodiment of the disclosure. The method corresponds to the third option described above. At block 602, the network exposure node receives, from a first application server in operator trust domain, configuration information that contains ID information of the terminal device, network address or ID information of the first application server and an APN. For example, block 602 may be implemented as block 402 or 502. At block 603, the network exposure node obtains, from a packet gateway node, the ID information and corresponding current network address information of the terminal device. For example, the packet gateway node may send the information actively or the network exposure node may inquire the packet gateway node about the information.

At block 604, the network exposure node receives data from the first application server. The data may be received in the form of non-IP data or IP data. For the case of the non-IP data, it may be received through T8 NIDD interface such as that defined in 3GPP TS 29.122. For the case of the IP data, the T8 NIDD interface may be reused for receiving the data. At block 606, the network exposure node forwards the data to the terminal device based on the current network address information of the terminal device corresponding to the ID information of the terminal device. For example, due to the reception of the data from the terminal device, the ID information of the terminal device and the APN may be known by the network exposure node. The current network address information of the terminal device corresponding to its ID information may be determined from the information obtained at block 603. Then, the determined network address information may be used for forwarding the data to the terminal device. For the case of the non-IP data, it may be forwarded through T8 NIDD procedure such as that defined in 3GPP TS 23.682. For the case of the IP data, it may be forwarded via a packet gateway node such as a PGW.

Figure 7:
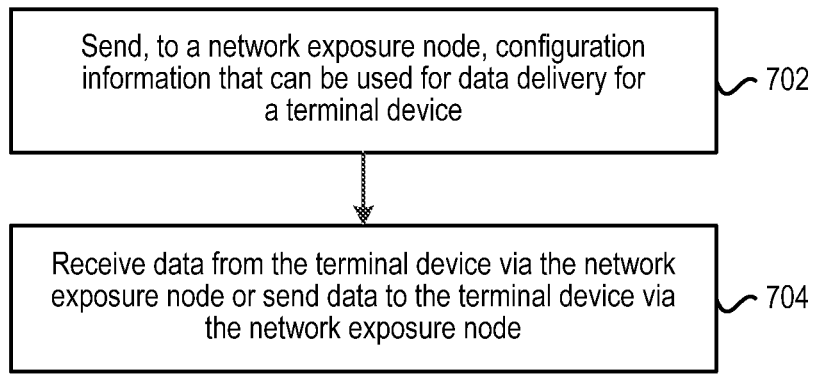
FIG. 7 is a flowchart illustrating a method implemented at an application server according to an embodiment of the disclosure.
Figure 8:
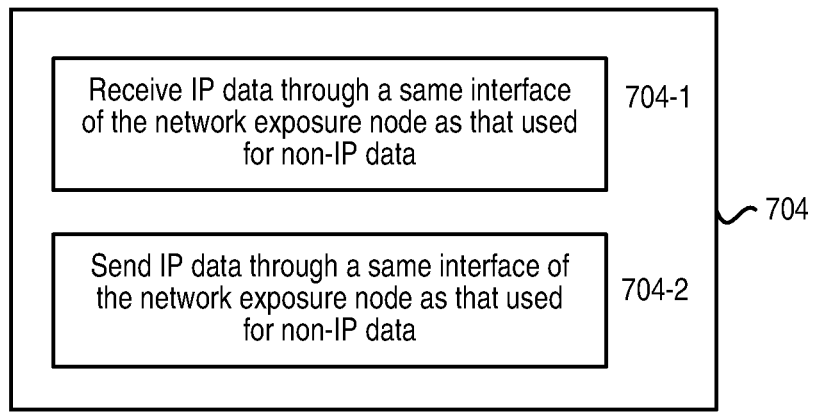
FIG. 8 is a flowchart for explaining the method of FIG. 7.

FIG. 7 is a flowchart illustrating a method implemented at an application server in operator trust domain according to an embodiment of the disclosure. For example, the application server may be deployed in operator mobile edge. At block 702, the application server sends, to a network exposure node, configuration information that can be used for data delivery for a terminal device. Block 702 may correspond to block 402, 502 or 602 and its details are omitted here. Optionally, the configuration information may contain network address or ID information of the application server and at least one additional destination to which data is to be delivered from the terminal device via the network exposure node.

At block 704, the application server receives data from the terminal device via the network exposure node or sends data to the terminal device via the network exposure node. Corresponding to block 406 and 506, in the first and second options described above, the data may be received via the network exposure node in the form of IP data or non-IP data. The IP data may be received through a same interface of the network exposure node as that used for the non-IP data, as shown in block 704-1. Corresponding to block 606, in the third option described above, the data may be sent via the network exposure node in a form of IP data or non-IP data. The IP data may be sent through a same interface of the network exposure node as that used for the non-IP data, as shown in block 704-2.

Figure 9:
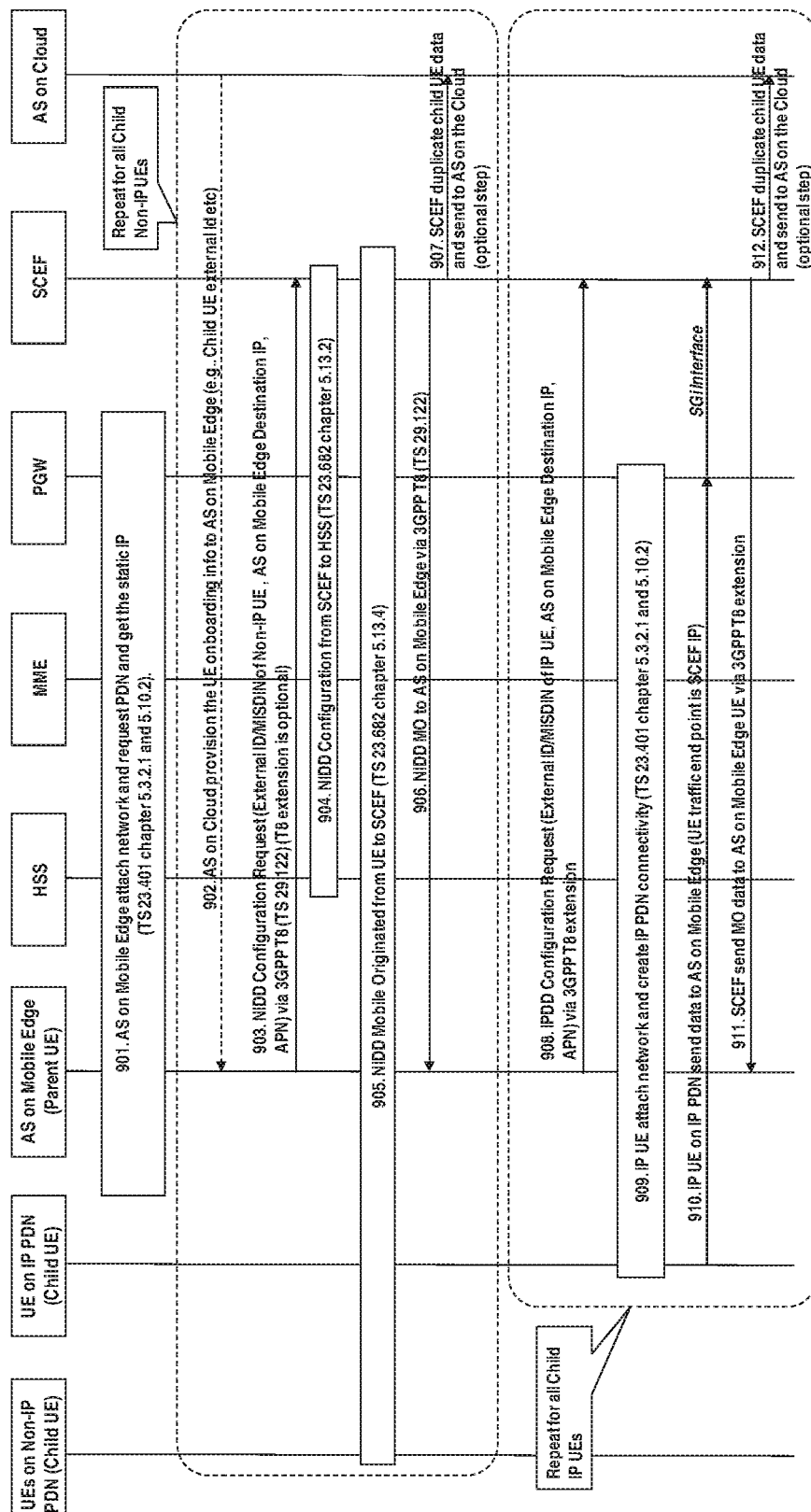
FIG. 9 is a flowchart illustrating an exemplary process according to an embodiment of the disclosure.
Figure 10:
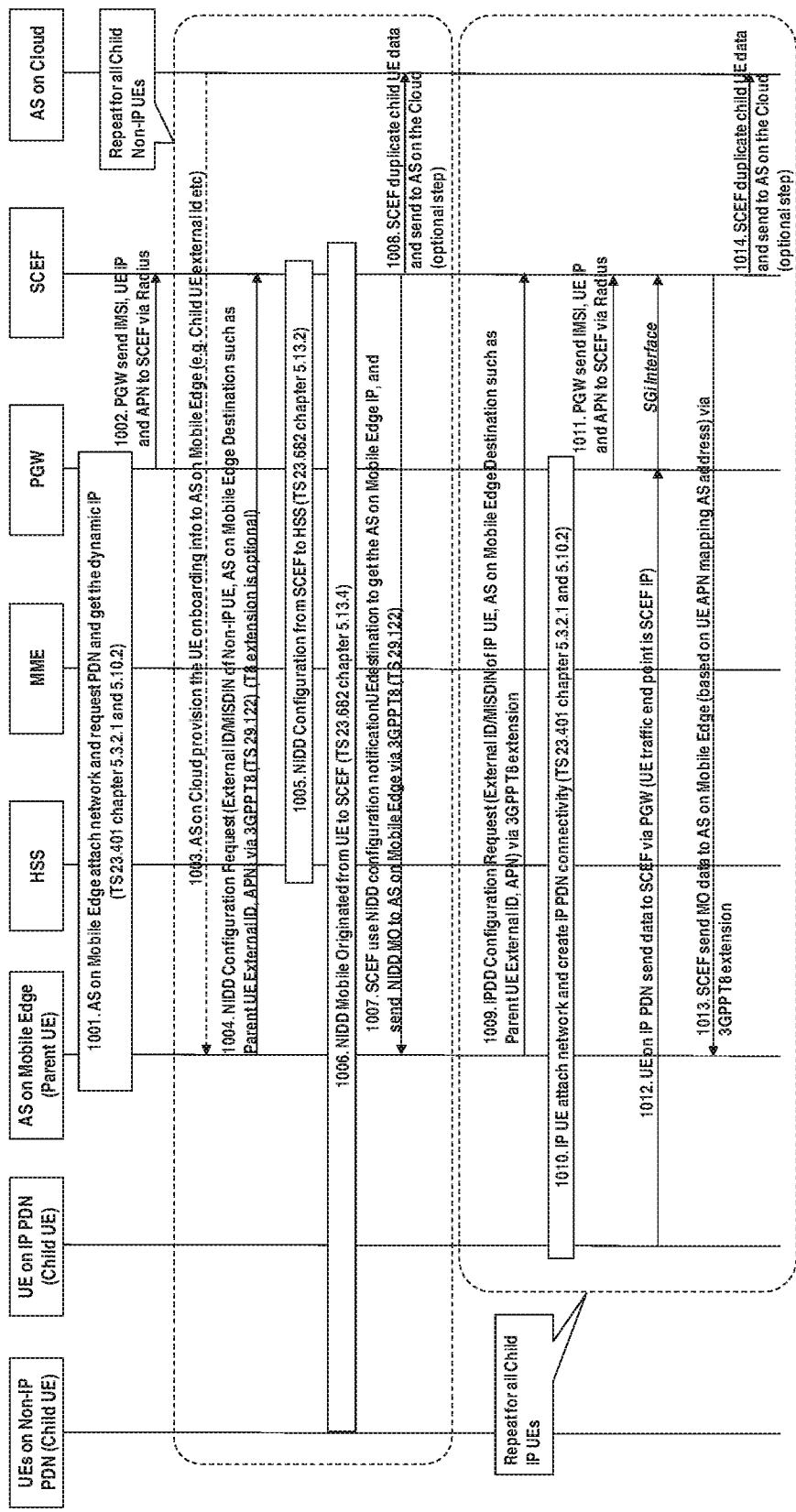
FIG. 10 is a flowchart illustrating an exemplary process according to another embodiment of the disclosure.
Figure 11:
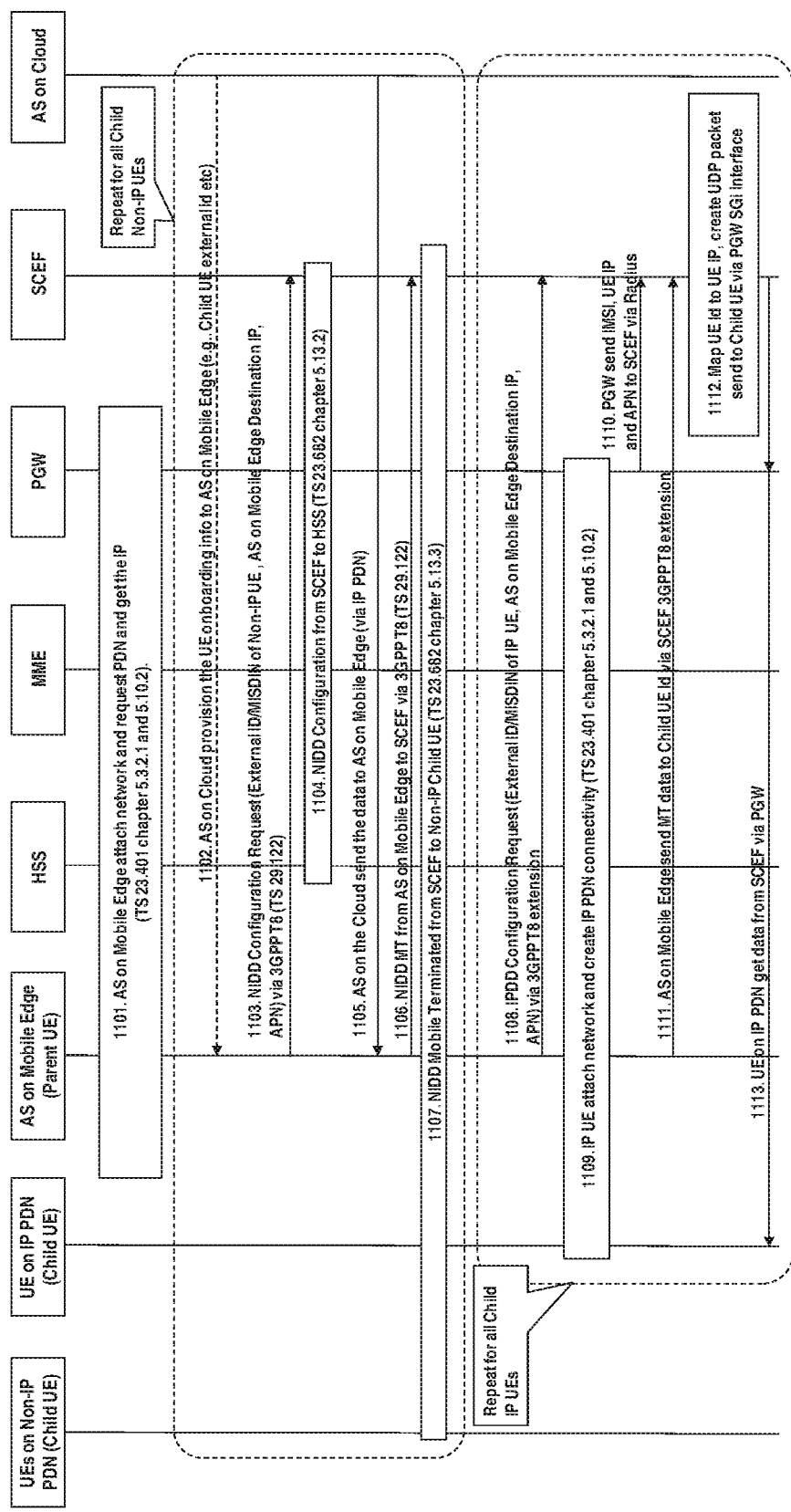
FIG. 11 is a flowchart illustrating an exemplary process according to another embodiment of the disclosure.

FIGS. 9 to 11 are flowcharts each illustrating an exemplary process according to an embodiment of the disclosure. In these exemplary processes, SCEF or NEF is used as network IoT message function for routing UE to UE communication within operator trust domain, instead of UE always communicating with AS on the cloud via 3GPP T8 APIs. Thus, a more easy way can be provided to route UE to AS on mobile edge communication within operator trust domain. The process of FIG. 9 is about the small data delivery from UE to mobile edge when the parent UE has static IP allocation. It covers both NIDD and IPDD for UE to AS on mobile edge.

At block 901, the AS on mobile edge attaches the network and requests packet data network (PDN) connection, thereby getting an static IP address. For example, details of this block may be obtained from 3GPP TS 23.401, chapter 5.3.2.1. At block 902, the AS on cloud provisions UE onboarding information (e.g. child UE external ID, etc.) to the AS on mobile edge via an interface defined between the application servers. At block 903, the AS on mobile edge sends a request to the SCEF for NIDD Configuration. The request includes External ID/MSISDN of Non-IP UE, AS on mobile edge Destination IP and APN. The request may be sent via an interface such that defined in 3GPP T8 TS 29.122.

Optionally, the cardinality of 'notificationDestination' in the NIDD Configuration request may be changed from 1 to 1 . . . N in order to support multiple notification destination, as shown below.

| Attribute name | Data type | Cardinality | Description |
| --- | --- | --- | --- |
| notificationDestination | Link | 1 . . . N | An URI of a notification destination that T8 message shall be delivered to. |

At block 903, in additional to the AS on mobile edge destination, the AS on the cloud destination may also be also added as NIDD MO destination address. In this way, the SCEF can support multiple destination data delivery in T8 Data Delivery API so that both the AS on mobile edge and the AS on the cloud can receive the child UE MO data.

At block 904, the SCEF sends the NIDD configuration to the HSS in terms of TS 23.682, chapter 5.13.2. At block 905, the child Non-IP UE sends NIDD Mobile Originated data to the SCEF in terms of TS 23.682, chapter 5.13.4. At block 906, the SCEF sends NIDD MO data to the AS on mobile edge via 3GPP T8 TS 29.122 NIDD API. Optionally, at block 907, the SCEF duplicates the child UE's data payload and sends it to the AS on the cloud. The AS on the cloud address used for sending the data is defined in block 903 for NIDD Configuration. Blocks 902 to 907 may be repeated for all child Non-IP UEs.

At block 908, the AS on mobile edge sends IP Data Delivery Configuration Request (including External ID/MISDIN of UE IP, AS on mobile edge Destination IP, APN) via 3GPP T8 extension. In this way, the NIDD Configuration API (such as that defined in 3GPP TS 29.122) can be reused for IP Data Delivery Configuration. Optionally, the above 'notificationUEDestination' indicating multiple notification destinations may be used for the UE communication routing address. The IPDD configuration may also be sent from the SCEF to the HSS.

At block 909, the IP UE attaches the network and creates IP PDN connectivity. The details of this block may be obtained from TS 23.401, chapter 5.3.2.1 and 5.10.2. At block 910, the UE on IP PDN sends data to the SCEF via PGW SGi interface and the UE traffic end point is the SCEF IP address. At block 911, the SCEF embeds IP UE MO data payload (typically is UDP based) in T8 NIDD MO API to the AS on mobile edge (based on the NIDD configuration notification destination) via 3GPP T8 extension. In this way, the 3GPP T8 NIDD API can be reused for IP data delivery to make common APIs for small data delivery in both Non-IP and IP connection. That is, T8 interface is reused for IP based small data delivery that typically is UDP based data. Optionally, at block 912, the SCEF duplicates the child UE's data payload and sends it to the AS on the cloud. The AS on the cloud address used for sending the data is defined in block 903 for NIDD Configuration. Blocks 908 to blocks 912 may be repeated for all Child IP UEs.

The process of FIG. 10 is about small data delivery from UE to mobile edge and the parent UE has dynamic IP allocation. At block 1001, the AS on mobile edge attaches the network and requests PDN connection, thereby getting a dynamic IP address. For example, details of this block may be obtained from 3GPP TS 23.401, chapter 5.3.2.1 and 5.10.2. At block 1002, the PGW sends IMSI, UE IP and APN to the SCEF via Radius or other pre-defined interface between the SCEF and the PGW. Alternatively, the SCEF may inquire the PGW about IMSI, UE IP and APN via Radius or other pre-defined interface. At block 1003, the AS on cloud provisions the UE onboarding information (e.g. child UE external ID, etc.) to the AS on mobile edge, which interface define by Application Server.

At block 1004, the AS on mobile edge sends NIDD Configuration Request to the SCEF (including External ID/MISDIN of Non-IP UE, AS on mobile edge Destination such as Parent UE External ID, APN) via 3GPP T8 API such as that defined in 3GPP TS 29.122. For example, the following attribute may be added in the definition of type 'NiddConfiguration' for UE communication route address, instead of the 3GPP defined 'notificationDestination' that is URI.

| Attribute name | Data type | Cardinality | Description |
| --- | --- | --- | --- |
| notificationUEDestination | array(string) | 0 . . . 1 | An External Id or MSISDN of a notification UE destination that T8 message shall be delivered to. |

Optionally, this NIDD Configuration may also reuse block 903 for changing the cardinality of 'notificationDestination' from 1 to 1 . . . N in order to support the multiple notification destination.

At block 1005, the SCEF sends NIDD Configuration to the HSS in terms of TS 23.682, chapter 5.13.2. At block 1006, the Non-IP Child UE sends NIDD Mobile Originated data to the SCEF. The details of this block may be obtained from TS 23.682, chapter 5.13.4. At block 1007, the SCEF uses NIDD configuration 'notificationUEdestination' to get the AS on mobile edge IP address, and send NIDD MO data to the AS on mobile edge via 3GPP T8 (see, for example, TS 29.122). Optionally, at block 1008, the SCEF duplicates the child UE's data payload and sends it to the AS on the cloud. The AS on the cloud address used for sending the data is defined in block 1004 for NIDD Configuration. Blocks 1003 to 1008 may be repeated for all Child Non-IP UEs.

At block 1009, the AS on mobile edge sends IP Data Delivery Configuration Request (External ID/MISDIN of UE IP, AS on mobile edge Destination such as Parent UE External ID, APN) via 3GPP T8 extension. In this way, NIDD Configuration API such as that defined in 3GPP TS 29.122 can be reused for IP Data Delivery Configuration. Optionally, this IPDD Configuration may also reuse block 903 for changing the cardinality of 'notificationDestination' from 1 to 1 . . . N in order to support the multiple notification destination.

At block 1010, the IP UE attaches the network and create IP PDN connectivity. The details of this block may be obtained from TS 23.401, chapter 5.3.2.1 and 5.10.2. At block 1011, the PGW sends IMSI, UE IP and APN to the SCEF via Radius or other pre-defined interface between SCEF and PGW. Alternatively, the SCEF may inquire the PGW about IMSI, UE IP and APN via Radius or other pre-defined interface. At block 1012, the UE on IP PDN sends data to the SCEF via PGW and the UE traffic end point is the SCEF IP address. At block 1013, the SCEF sends MO data to the AS on mobile edge (based on the AS address mapped with the UE ID and APN) via 3GPP T8 extension. Optionally, at block 1014, the SCEF duplicates the child UE's data payload and sends it to the AS on the cloud. The AS on the cloud address used for sending the data is defined in 'notificationDestination' in the definition of 'NiddConfiguration' API in 3GPP TS 29.122 T8 APIs (see, for example, chapter 5.6.2.1.2). Blocks 1009 to 1014 may be repeated for all Child IP UEs.

In the process of FIG. 10, 3GPP T8 API NIDD Configuration is proposed to add Parent UE External ID or MSISDN, so that the SCEF can map the Parent UE External ID or MSISDN to Parent UE IP address (thus supporting dynamic IP allocation) for providing the way to route UE data towards AS on mobile edge. The exemplary processes shown in FIGS. 9 and 10 can be applied to the communication from UE to AS on mobile edge so that a number of child UEs' data can be aggregated in one parent UE that located in mobile edge in operator trust domain. Thereafter the mobile edge may send the aggregated data to the AS on the internet cloud.

The process of FIG. 11 is about small data delivery from mobile edge (Parent UE) to UE (Child UE). At block 1101, the AS on mobile edge attaches the network and creates PDN connection, thereby getting an IP address. The details of this block may be obtained from 3GPP TS 23.401, chapter 5.3.2.1 and 5.10.2. At block 1102, the AS on cloud provisions the UE onboarding information (e.g. Child UE external ID, etc.) to the AS on mobile edge that interface defined by AS. At block 1103, the AS on Mobile Edge sends NIDD Configuration Request (including External ID/MISDIN of Non-IP UE, AS on mobile edge Destination IP, APN) via 3GPP T8 (see, for example, TS 29.122). At block 1104, the SCEF sends the NIDD configuration to the HSS in terms of TS 23.682, chapter 5.13.2.

At block 1105, the AS on the cloud sends data to the AS on mobile edge. At block 1106, the AS on mobile edge sends NIDD MT data to the SCEF via 3GPP T8 (see, for example, TS 29.122). At block 1107, the NIDD MT data is sent from the SCEF to the Non-IP Child UE (see, for example, TS 23.682, chapter 5.13.3). Blocks 1102 to 1107 may be repeated for all Non-IP Child UEs.

At block 1108, the AS on mobile edge sends IP Data Delivery Configuration Request (including External ID/MISDIN of UE IP, AS on mobile edge Destination IP, APN) via 3GPP T8 extension. Optionally, the above 'notificationUEDestination' indicating multiple notification destinations may be used for the UE communication routing address. The IPDD configuration may also be sent from the SCEF to the HSS. At block 1109, the IP UE attaches the network and creates IP PDN connection (see, for example, TS 23.401, chapter 5.3.2.1 and 5.10.2). At block 1109, the PGW sends IMSI, UE IP and APN to the SCEF via Radius or other pre-defined interface between SCEF and PGW. Alternatively, the SCEF may inquire the PGW about IMSI, UE IP and APN via Radius or other pre-defined interface.

At block 1110, the AS on mobile edge sends MT data to the Child UE ID via SCEF 3GPP T8 API. In this way, NIDD API of the SCEF may be reused for IP Data Delivery which is small data delivery typically based on UDP protocol. At block 1111, the SCEF maps UE ID to UE IP, creates UDP packet and sends it to the Child UE via PGW SGi Interface. At block 1112, the UE on IP PDN gets data from the SCEF via PGW. Blocks 1108 to 1112 may be repeated for all IP Child UEs. It should be noted that two blocks shown in succession in the above figures may, in fact, be executed substantially concurrently, or the blocks may sometimes be executed in the reverse order, depending upon the functionality involved.

Figure 12:
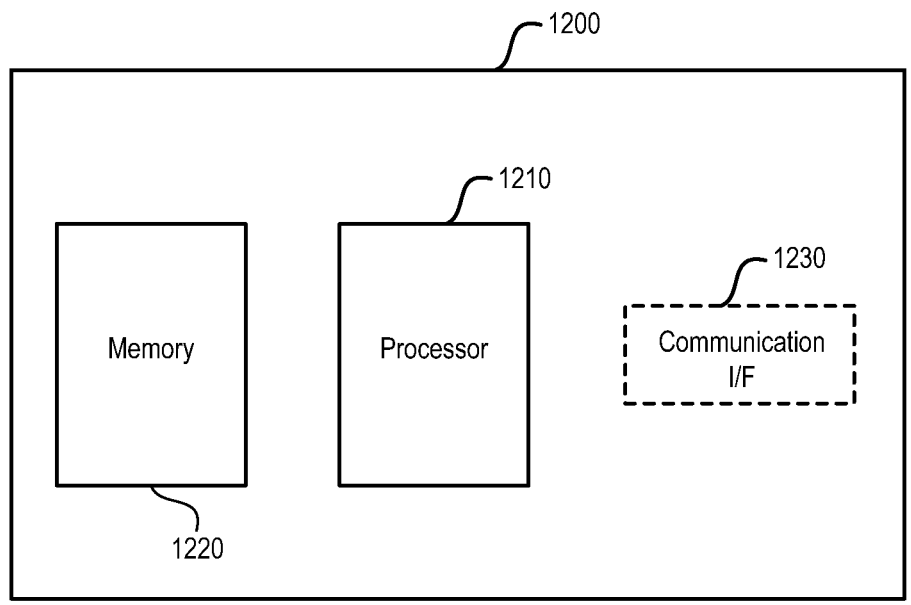
FIG. 12 is a block diagram showing an apparatus suitable for use in practicing some embodiments of the disclosure.

FIG. 12 is a block diagram showing an apparatus suitable for use in practicing some embodiments of the disclosure. For example, any one of the network exposure node and the application server described above may be implemented through the apparatus 1200. As shown, the apparatus 1200 may include a processor 1210, a memory 1220 that stores a program, and a communication interface 1230 for communicating data with other external devices through wired and/or wireless communication.

The program includes program instructions that, when executed by the processor 1210, enable the apparatus 1200 to operate in accordance with the embodiments of the present disclosure, as discussed above. That is, the embodiments of the present disclosure may be implemented at least in part by computer software executable by the processor 1210, or by hardware, or by a combination of software and hardware.

The memory 1220 may be of any type suitable to the local technical environment and may be implemented using any suitable data storage technology, such as semiconductor based memory devices, flash memories, magnetic memory devices and systems, optical memory devices and systems, fixed memories and removable memories. The processor 1210 may be of any type suitable to the local technical environment, and may include one or more of general purpose computers, special purpose computers, microprocessors, digital signal processors (DSPs) and processors based on multi-core processor architectures, as non-limiting examples.

Figure 13:
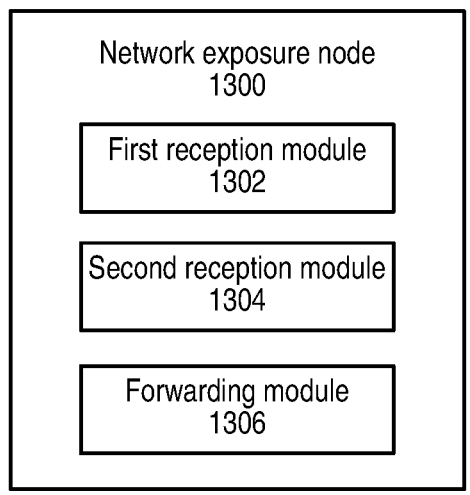
FIG. 13 is a block diagram showing a network exposure node according to an embodiment of the disclosure.

FIG. 13 is a block diagram showing a network exposure node according to an embodiment of the disclosure. As shown, the network exposure node 1300 comprises a first reception module 1302, a second reception module 1304 and a forwarding module 1306. The first reception module 1302 may be configured to receive, from a first application server in operator trust domain, configuration information that can be used for data delivery for a terminal device, as described above with respect to block 302. The second reception module 1304 may be configured to receive data from one of the terminal device and the first application server, as described above with respect to block 304. The forwarding module 1306 may be configured to forward the data to the other of the terminal device and the first application server based on the configuration information, as described above with respect to block 306.

Figure 14:
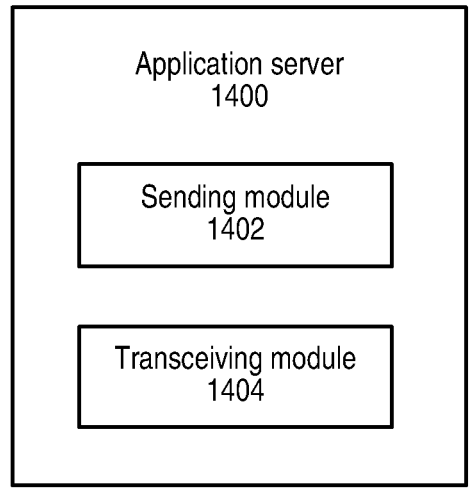
FIG. 14 is a block diagram showing an application server according to an embodiment of the disclosure.

FIG. 14 is a block diagram showing an application server in operator trust domain according to an embodiment of the disclosure. As shown, the application server 1400 comprises a sending module 1402 and a transceiving module 1404. The sending module 1402 may be configured to send, to a network exposure node, configuration information that can be used for data delivery for a terminal device, as described above with respect to block 702. The transceiving module 1404 may be configured to receive data from the terminal device via the network exposure node or send data to the terminal device via the network exposure node, as described above with respect to block 704. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a network exposure node, the method comprising:
    receiving, from a first application server in operator trust domain, configuration information that can be used for data delivery for a terminal device;
    receiving data from the terminal device or the first application server;
    forwarding the data to the terminal device or the first application server based on the configuration information; and
    the receiving and forwarding comprises Internet protocol (IP) data and non-IP data communicated through a same T8 non-IP data delivery (NIDD) interface.

2. The method according to claim 1, wherein the first application server is deployed in operator mobile edge.

3. The method according to claim 1, wherein:
    the configuration information comprises identity (ID) information of the terminal device, network address information of the first application server and an access point name (APN); and
    the data is received from the terminal device and forwarded to the first application server based on the network address information of the first application server corresponding to the ID information of the terminal device and the APN.

4. The method according to claim 1, wherein:
    the configuration information comprises ID information of the terminal device, ID information of the first application server and an APN;
    the method further comprises: obtaining, from a packet gateway node, the ID information and corresponding current network address information of the first application server; and
    the data is received from the terminal device and forwarded to the first application server based on the current address information of the first application server corresponding to the ID information of the terminal device and the APN.

5. The method according to claim 1, wherein:
    the configuration information comprises network address or ID information of at least one additional destination to which data is to be delivered from the terminal device; and
    the method further comprises forwarding the data received from the terminal device to the at least one additional destination based on the configuration information.

6. The method according to claim 5, wherein one of the at least one additional destination is a second application server in Internet domain.

7. The method according to claim 1, wherein the data is received from the terminal device in a form of the IP data or the non-IP data; and
    wherein the IP data is forwarded through the same interface as that used for the non-IP data.

8. The method according to claim 1, wherein:
    the data is received from the first application server in a form of the non-IP data or the IP data; and
    the IP data is received from the first application server through the same interface as that used for the non-IP data.

9. The method according to claim 8, wherein:
    the configuration information comprises ID information of the terminal device, network address or ID information of the first application server and an APN;
    the data is received from the first application server in a form of IP data, and the method further comprises: obtaining, from a packet gateway node, the ID information and corresponding current network address information of the terminal device; and
    the IP data is forwarded to the terminal device based on the current network address information of the terminal device corresponding to the ID information of the terminal device.

10. The method according to claim 7, wherein the network exposure node is a service capability exposure function (SCEF) or a network exposure function (NEF).

11. The method according to claim 3, wherein the ID information is an external ID or a mobile subscriber international ISDN number (MSISDN) and the network address information is a uniform resource identifier (URI).

12. A method implemented at an application server in operator trust domain, the method comprising:
    sending, to a network exposure node, configuration information that can be used for data delivery for a terminal device;
    receiving data from the terminal device via the network exposure node or sending data to the terminal device via the network exposure node; and
    the sending and receiving comprises Internet protocol (IP) data and non-IP data communicated through a same T8 non-IP data delivery (NIDD) interface.

13. The method according to claim 12, wherein the application server is deployed in a operator mobile edge.

14. The method according to claim 12, wherein the configuration information comprises network address or identity, ID, information of the application server and at least one additional destination to which data is to be delivered from the terminal device via the network exposure node.

15. The method according to claim 12, wherein:
    the data is received via the network exposure node in a form of the IP data or the non-IP data; and
    the IP data is received through the same interface of the network exposure node as that used for the non-IP data.

16. The method according to claim 12, wherein:
the data is sent via the network exposure node in a form of the IP data or the non-IP data; and
the IP data is sent through the same interface of the network exposure node as that used for the non-IP data.

17. The method according to claim 15, wherein the network exposure node is a service capability exposure function (SCEF) or a network exposure function (NEF).

18. A network exposure node comprising:
at least one processor; and
at least one memory containing instructions executable by the at least one processor, whereby the network exposure node is configured to:
receive, from a first application server in operator trust domain, configuration information that can be used for data delivery for a terminal device;
receive data from the terminal device or the first application server;
forwarding the data to the terminal device or the first application server based on the configuration information; and
the receiving and forwarding comprises Internet protocol (IPI data and non-IP data communicated through a same T8 non-IP data delivery (NIDD) interface.

19. The network exposure node according to claim 18, wherein:
the configuration information comprises identity (ID) information of the terminal device, network address information of the first application server and an access point name (APN); and
the data is received from the terminal device and forwarded to the first application server based on the network address information of the first application server corresponding to the ID information of the terminal device and the APN.

20. The network exposure node according to claim 18, wherein:
the configuration information comprises ID information of the terminal device, ID information of the first application server and an APN;
execution of the instructions by the at least one processor further configures the network exposure node to obtain, from a packet gateway node, the ID information and corresponding current network address information of the first application server; and
the data is received from the terminal device and forwarded to the first application server based on the current address information of the first application server corresponding to the ID information of the terminal device and the APN.

* * * * *